Aug. 9, 1955
E. ALBERS-SCHOENBERG
2,715,109

FERROMAGNETIC CERAMIC MATERIALS WITH HYSTERESIS LOOPS OF RECTANGULAR SHAPE

Filed June 14, 1954

2 Sheets-Sheet 1

INVENTOR.
ERNST ALBERS-SCHOENBERG

BY

Greene, Pineles & Durr

ATTORNEYS

Aug. 9, 1955 E. ALBERS-SCHOENBERG 2,715,109

FERROMAGNETIC CERAMIC MATERIALS WITH HYSTERESIS LOOPS OF RECTANGULAR SHAPE

Filed June 14, 1954 2 Sheets-Sheet 2

INVENTOR.
ERNST ALBERS-SCHOENBERG
BY
Greene, Pineles & Durr
ATTORNEYS

United States Patent Office 2,715,109

Patented Aug. 9, 1955

2,715,109

FERROMAGNETIC CERAMIC MATERIALS WITH HYSTERESIS LOOPS OF RECTANGULAR SHAPE

Ernst Albers-Schoenberg, Metuchen, N. J., assignor to Steatite Research Corporation, Keasbey, N. J., a corporation of Delaware Application June 14, 1954, Serial No. 436,507

6 Claims. (Cl. 252—62.5)

This invention relates to the ferromagnetic ceramic ferrite bodies which have square or rectangular hysteresis loops.

This application is a continuation-in-part of U. S. applications Nos. 253,779, filed October 30, 1951, and No. 270,351, filed February 7, 1953, now abandoned.

Applications No. 253,779 and No. 270,351 are based on the discovery that certain of the magnesium-manganese type of ferrites have square hysteresis loops, a property which makes them especially desirable in applications for magnetic store devices in computer mechanisms. Application No. 253,779 is concerned with the ferrites which consist almost entirely of manganese-magnesium ferrites with possibly only a small amount of zinc oxide whereas application No. 270,351 discloses that certain small amounts of $Fe_2O_3$ may be replaced by another trivalent oxide ($M_2O_3$) and that certain small amounts of a bivalent oxide (MO) may be employed to replace a small portion of one of the bivalent oxides MnO or MgO.

Among the objects of this invention is to provide a magnesium-manganese type of ferrite which is modified so as to have relatively sharp corners.

Among other objects of the invention is to provide a ferrite with a square hysteresis loop which has a very low coercive force, of less than 0.75 oersted for example.

In said application No. 253,779 calcium oxide is mentioned as a possible addition or substitution for another bivalent oxide. This invention is based on the discovery that within certain narrow limits by addition of calcium oxide, and to a certain extent also by cadmium oxide, a very special square loop body is obtained. For example, the said body has a hysteresis loop of exceptional squareness and has exceptionally sharp corners (a property which is especially desirable in computer circuits) and a high $B_r/B_s$ and squareness ratio.

In the technical literature on ferrite compounds it has been pointed out that with respect to the bivalent metal oxide, a certain ion-size is a prerequisite for otherwise the cubic crystal lattice would not develop properly after the reaction with the iron oxide has taken place. The most suitable ion size is between 0.7 and 0.9 Å. units. Ions, that fit most perfectly into this scheme are $Fe^{++}$ (0.83); $Co^{++}$ (0.82); $Ni^{++}$ (0.78); $Mn^{++}$ (0.91); $Zn^{++}$ (0.83); $Mg^{++}$ (0.78). Calcium, $Ca^{++}$ (1.06), and cadmium, $Cd^{++}$ (1.03) are borderline cases, being somewhat larger than the ordinary ferrite oxides but being still capable of entering the cubic lattice in a mixed crystal.

It is believed that the specific and beneficial effect on square loop ferrites of the small additions of calcium and/or cadmium oxide is due to their ion size which, it is believed, produces a mild internal strain in the crystal which helps to develop and to improve the rectangularity of the hysteresis loop. In accordance with this theory oxides of other metals wherein the metal ion size is between 1.0 and 1.1, such as the trivalent yttrium oxide ($Y^{+++}$=1.06 Å.) may also be considered as an ingredient capable of improving the said magnesium manganese ferrites in the same way that calcium and cadmium oxide do.

The proportion of added oxide of larger ion size should be from about 0.5 to about 7.0% by weight. For calcium oxide, the amount added preferably corresponds to from 0.5 to 5.0 percent by weight of the composition. The cadmium oxide content is preferably between about 1.0 and 7.0 percent by weight of the composition. With yttrium oxide the preferred amount seems to be somewhat lower, between 3 and 6 percent by weight of the composition. Mixtures of these oxides may also be employed provided the total amount is not more than 7%.

The additions of calcium oxide, cadmium oxide or other oxides of around 1.0 Å. units ion size for improving the squareness of the hysteresis response are especially suitable for compositions consisting of 5–60 mol percent of manganese oxide, 8–50 mol percent of magnesium oxide and 25 to 50 mol percent of ferric oxide.

The invention both as to its organization and its method of operation together with additional objects and advantages thereof will best be understood from the following description of specific embodiments thereof when read in connection with the accompanying drawing in which.

The following examples illustrate how the products of the invention were made.

*Example 1*

A mixture containing the following ingredients:

| | Parts by weight |
|---|---|
| MgO | 12.5 |
| $CaCO_3$ | 4.0 |
| $Mn_3O_4$ | 21.5 |
| $Fe_2O_3$ | 62.5 |

is wet ball milled, dried, pulverized and calcined. After calcining it is remilled and again dried and pulverized. After adding about 1% of an organic binder, such as flour or gum, and about 5% of water, the powder is screened through a 20 mesh screen and the resulting granulation is molded in a steel die. The molded pieces are placed on a refractory slab and fired at 2350–2400° F. The pieces from which the properties listed below were established were toroidal in shape having an outside diameter of approximately 10 mm., an inside diameter of approximately 4 mm. and a thickness of about 3 mm.

This body has a minimum driving current which is only about 40% of that of approximately the same composition but without an addition of calcium oxide and a switching time of 5–7 microseconds.

*Example 2*

A mixture containing the following ingredients:

| | Percent by weight |
|---|---|
| MgO | 13.0 |
| $Mn_3O_4$ | 22.0 |
| $Fe_2O_3$ | 65.0 |

is treated and formed into a ferrite in the same way as the composition of Example 1.

A comparison of magnetic properties of the materials of Examples 1 and 2 is shown in the following table:

| | Example | |
|---|---|---|
| | 1 | 2 |
| Initial permeability | 45 | 40 |
| Maximum permeability | 1,600 | 515 |
| Saturation Flux Density, (DC), gauss | 2,000 | 1,780 |
| Retentivity, DC gauss | 1,920 | 1,590 |
| Coercive Force, oersteds | 0.65 | 1.5 |
| Switching time, microseconds | 4 | 1 |
| $B_r/B_s$ Ratio | 0.96 | 0.90 |
| Maximum Squareness Ratio | 0.95 | 0.8 |
| Optimum Magnetomotive Force, oersteds | 0.80 | 2.0 |

Figure 1:
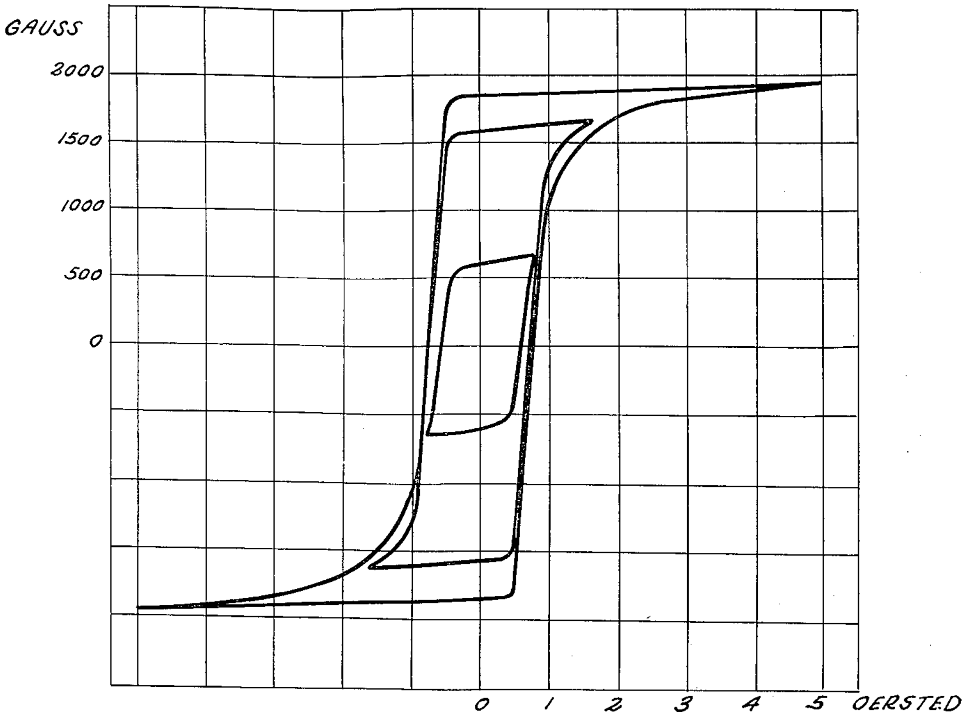
Fig. 1 is a reproduction of the actual pictures of hysteresis loops at different values of magnetomotive force with a calcium oxide containing ferrite of the invention as the magnetized material.

It will be noted that the values for the properties of Example 2 differ considerably from the corresponding properties of Example 1 although the composition of Example 2 is very similar to that of Example 1 except that Example 2 contains no calcium oxide. The values for Example 1 correspond to the hysteresis loops of Fig. 1.

The squareness ratio is measured in the following way. The ferrite is magnetized under a first magnetomotive force, and the flux density is measured. Thereafter, a magnetomotive force of opposite polarity and one half the value of the first magnetomotive force is applied to the ferrite and the flux density is measured. The ratio of the latter value of flux density to the first flux density is a measure of the squareness of the loop. The higher this value is the more useful the product is in memory systems.

Figure 3:
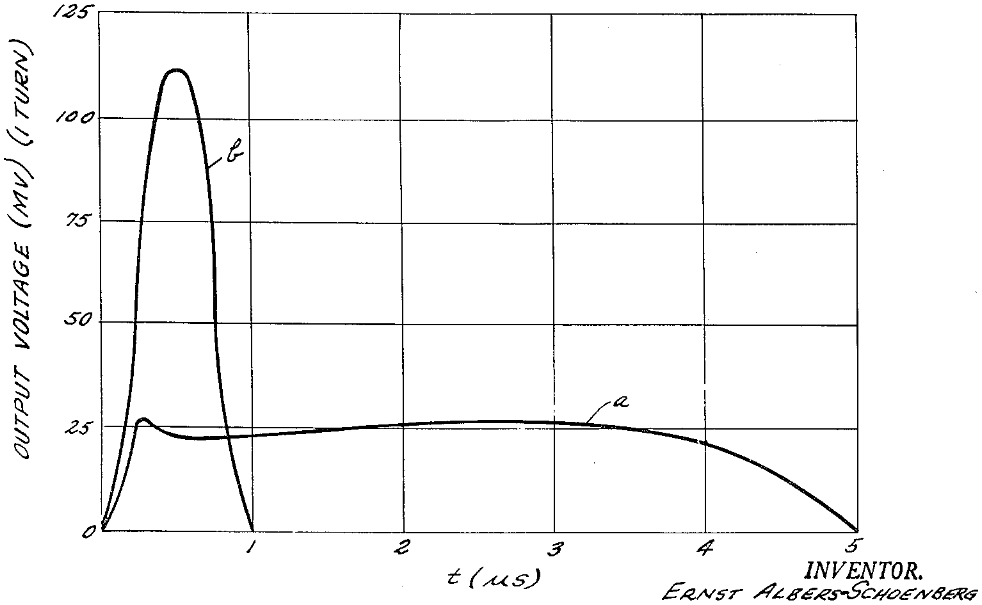
Fig. 3 is a graph showing comparative time response curves at 25° C. for the magnetic ferrite of this invention (Fig. 1) and the similar but calcium free ferrite of Fig. 2.
Figure 2:
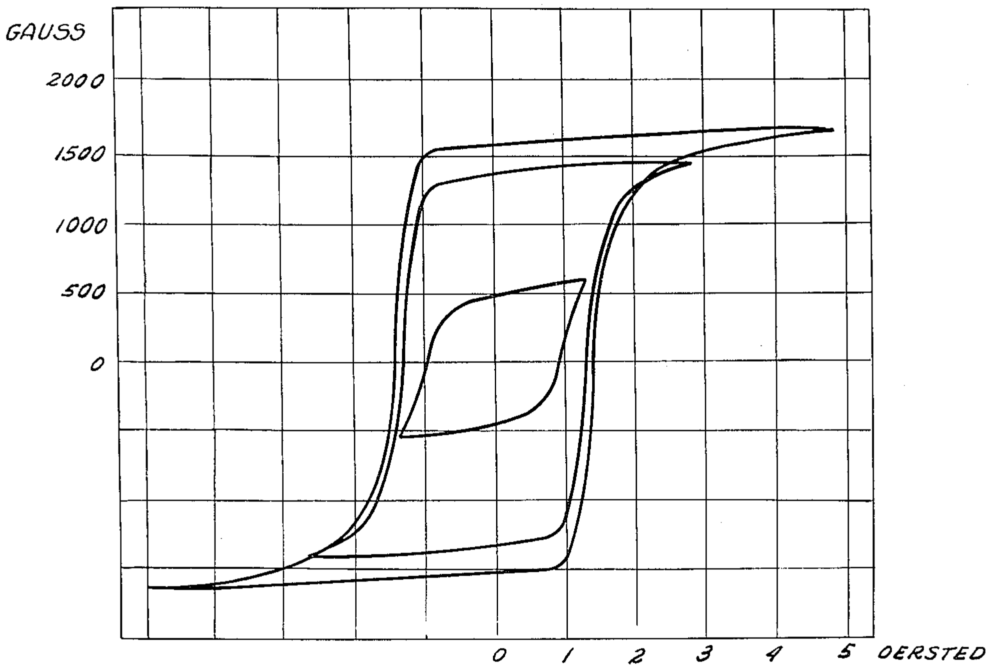
Fig. 2 represents the same composition but free of calcium oxide.

In Fig. 3, curve *a* shows a typical curve of time in microseconds versus output voltage of Example 1. Curve *b* shows a similar response for the ferrite whose properties are described in column 2 of the table. It will be noted that the response time of 5 microseconds for the product of this invention is relatively long compared to the older type material. This latter product is especially desirable for the high speed calculators and heretofor considerable emphasis has been placed on obtaining magnetic materials with short response times. There is a definite place, however, for ferrites requiring low driving force in smaller types of commercial calculators. In these smaller calculators the longer response time of Example 1 is not a disadvantage and the flat substantially uniform response over the first four microseconds is an advantage.

*Example 3*

A mixture of the following ingredients was prepared, molded and fired as in the previous example:

| | Percent by weight |
|---|---|
| $MgO$ | 5.0 |
| $CaCO_3$ | 3.5 |
| $Mn_3O_4$ | 30.0 |
| $Fe_2O_3$ | 61.5 |

In this product the minimum driving current is slightly higher than in Example 1 and the switching time is 5–7 microseconds. The hysteresis loop shows good rectangularity but the corners are not quite as sharp as in Example 1.

The following are a few more examples of body compositions that have successfully been used under low driving current conditions.

*Example 4*

| | Parts by weight |
|---|---|
| $MgO$ | 12.5 |
| $CdCO_3$ | 7.0 |
| $Mn_3O_4$ | 21.5 |
| $Fe_2O_3$ | 62.5 |

*Example 5*

| | Parts by weight |
|---|---|
| $MgO$ | 10 |
| $CdCO_3$ | 8 |
| $MnO_2$ | 21 |
| $Fe_2O_3$ | 63 |

*Example 6*

| | Parts by weight |
|---|---|
| $MgO$ | 12.5 |
| $CaCO_3$ | 1.0 |
| $Y_2O_3$ | 3.0 |
| $Mn_3O_4$ | 21.5 |
| $Fe_2O_3$ | 62.5 |

In all of the above Examples 4–6 the properties of the products are comparable to those of Example 1, except that the coercive force is not as low as that in Example 1.

The features and principles underlying the invention described above in connection with specific exemplifications will suggest to those skilled in the art many other modifications thereof. It is accordingly desired that the appended claims shall not be limited to any specific feature or details thereof.

I claim:

1. A fired ferromagnetic ferrite of the magnesium manganese ferrite type which exhibits a rectangular hysteresis loop consisting essentially of 5–60 mol percent of manganese oxide, 8–50 mol percent of magnesium oxide, 25–50 mol percent of ferric oxide, characterized in that said ferrite contains in addition 0.5–7% by weight of a metallic oxide, in which the size of the metal ion is between 1.0 and 1.1 Å. units.

2. The ferrite as set forth in claim 1 in which the added metal oxide is a bivalent metal oxide.

3. The ferrite as set forth in claim 1 in which calcium oxide is the added metal oxide and is added in proportions of 0.5 to 5.0% by weight.

4. The ferrite as set forth in claim 1 in which cadmium oxide is the added metal oxide and is added in proportions of 1–7% by weight.

5. The ferrite as set forth in claim 1 in which yttrium oxide is the added metal oxide and is added in proportions of 1–6% by weight.

6. The ferrite as set forth in claim 1 in which a mixture of metal oxides having a metal ion size of 1.0 to 1.1 Å. is added.

No references cited.